United States Patent
Fuller et al.

(10) Patent No.: US 12,415,460 B2
(45) Date of Patent: Sep. 16, 2025

(54) FOLDABLE, MODULAR, REMOVABLE STEP

(71) Applicant: Lippert Components, Inc., Elkhart, IN (US)

(72) Inventors: Nathaniel Fuller, Granger, IN (US); Scott C. McKinnon, Union City, MI (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 1210 days.

(21) Appl. No.: 17/185,076

(22) Filed: Feb. 25, 2021

(65) Prior Publication Data

US 2021/0261061 A1    Aug. 26, 2021

Related U.S. Application Data

(60) Provisional application No. 62/981,789, filed on Feb. 26, 2020.

(51) Int. Cl.
*B60R 3/02* (2006.01)
*E06C 9/08* (2006.01)

(52) U.S. Cl.
CPC . *B60R 3/02* (2013.01); *E06C 9/08* (2013.01)

(58) Field of Classification Search
CPC .................................... B60R 3/02; E06C 9/08
See application file for complete search history.

(56) References Cited

U.S. PATENT DOCUMENTS

| | | | |
|---|---|---|---|
| 3,463,509 A | 8/1969 | Schiffner | |
| 3,871,479 A * | 3/1975 | Pelto | A62B 5/00 |
| | | | 182/86 |
| 4,264,084 A | 4/1981 | Telles | |
| 4,462,486 A | 7/1984 | Dignan | |
| 8,419,205 B1 | 4/2013 | Schmuckle | |
| 8,833,516 B1 | 9/2014 | Wurth et al. | |
| 9,771,025 B1 * | 9/2017 | Nebel | B60R 3/02 |
| 9,903,121 B2 * | 2/2018 | Tompkins | E04F 11/064 |
| 10,155,550 B2 | 12/2018 | Claerhout et al. | |
| 10,294,720 B2 * | 5/2019 | Nguyen | E06C 7/082 |
| 10,518,706 B2 * | 12/2019 | Granzotto | E06C 5/20 |
| 2008/0150251 A1 | 6/2008 | Roth et al. | |
| 2009/0200108 A1 | 8/2009 | Rathbone et al. | |
| 2019/0351832 A1 | 11/2019 | Fuller et al. | |
| 2020/0102788 A1* | 4/2020 | Byers | E06C 7/505 |

OTHER PUBLICATIONS

Pivoting Porch Stairs Conceal Storage Space, retrieved on Feb. 24, 2021 from https://www.finehomebuilding.com/2012/11/08/pivoting-porch-stairs-conceal-storage-space, 3 pp.

* cited by examiner

*Primary Examiner* — Jason D Shanske
(74) *Attorney, Agent, or Firm* — NIXON & VANDERHYE P.C.

(57) ABSTRACT

A stowable stair assembly with step treads connected between stair stringers includes stabilizing legs positioned within a width of the treads and behind the treads. A removable hinge assembly facilitates installation of the stair assembly as well as access to the stair assembly.

18 Claims, 11 Drawing Sheets

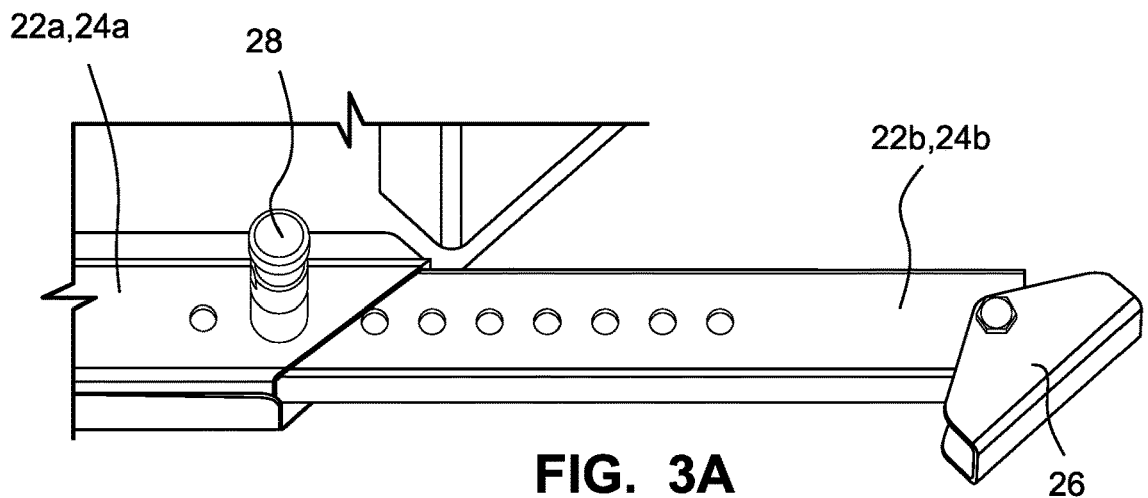
FIG. 3A
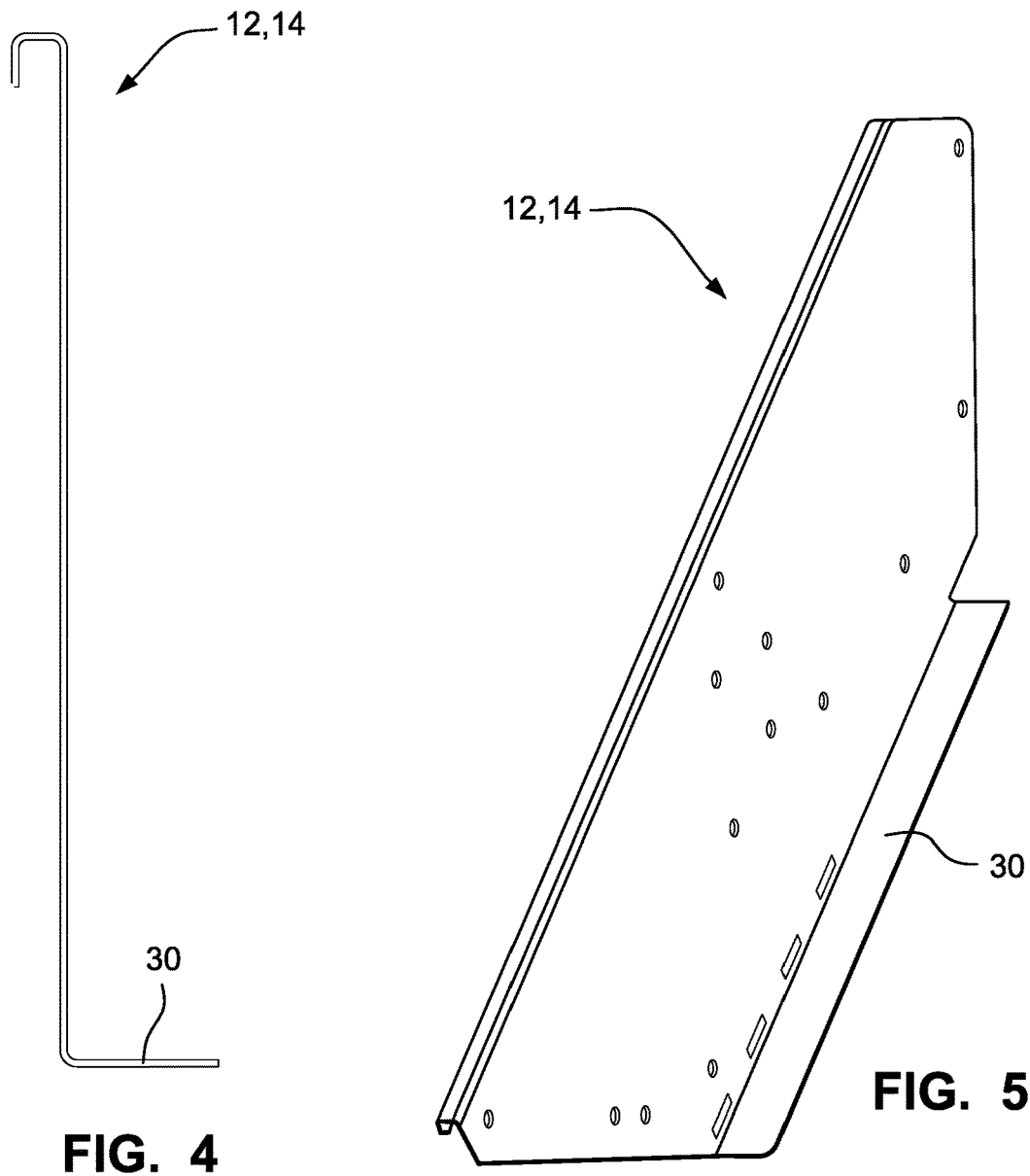
FIG. 4
FIG. 5

FOLDABLE, MODULAR, REMOVABLE STEP

CROSS-REFERENCES TO RELATED APPLICATIONS

This application claims the benefit of U.S. Provisional Patent Application Ser. No. 62/981,789, filed Feb. 26, 2020, the entire content of which is herein incorporated by reference.

STATEMENT REGARDING FEDERALLY SPONSORED RESEARCH OR DEVELOPMENT (NOT APPLICABLE)

BACKGROUND

The invention relates to a stowable stair assembly for use in connection with an entry door and doorway of a mobile structure or other structure and, more particularly, to a stowable stair assembly with wider treads due to repositioned stabilizing legs and incorporating a removable spring-loaded hinge.

In existing step assemblies, the telescoping stabilizer tubes are often mounted exterior to the step treads and side/stringer plates, resulting in elongated and bulky stringer assemblies. In some existing assemblies, the tubes may be mounted interior to the stringer plates, but these assemblies include a thicker or bulkier stringer plate in order to accommodate the telescoping stabilizer tubes.

Additionally, existing stowable stair assemblies typically utilize a non-movable piano hinge design, making it difficult to remove the stair assembly for repair, cleaning, replacement or the like.

SUMMARY

The stair assembly of the described embodiments includes telescoping stabilizing tubes that are discreetly mounted on the inside of a thin sheet or reduced material stringer plate without interfering with the step treads. As a consequence, the step treads can span a greater width for increased stepping area. Additionally, with the position of the telescoping stabilizing tubes, the step treads can be replaced if necessary without removing the assembly from a doorway or interfering with the stabilizing tubes.

A removable hinge assembly facilitates installation and removal of the stair assembly. The stair assembly can be completely removed from the structure from both a stowed position and a deployed position. As such, the stair assembly can be accessed even when unable to deploy the stairs such as in tight parking areas, narrow storage garages, etc. The hinge assembly also enables the use of a "beater" step while building the trailer, which can subsequently be readily replaced with a new step at final inspection.

In an exemplary embodiment, a stowable stair assembly includes a first stair stringer, a second stair stringer aligned with the first stair stringer, and a plurality of step treads connected between the first and second stair stringers. A first stabilizing leg is coupled with the first stair stringer, and a second stabilizing leg is coupled with the second stair stringer. Each of the first and second stabilizing legs includes a channel part and a telescoping part, and the channel parts of the first and second stabilizing legs are secured on inside facing surfaces of the first and second stair stringers, respectively.

The first and second stair stringers may be formed from a single sheet with a bent section, where the channel parts of the first and second stabilizing legs may be secured on the bent sections of the first and second stair stringers. The first and second stabilizing legs may be positioned within a width of the step treads and behind the step treads. The telescoping parts may be displaceable in the channel parts between a retracted position and an extended position, and each of the first and second stabilizing legs may include a locking pin positionable through the channel parts into the telescoping parts, respectively, to lock the telescoping parts relative to the channel parts.

The stowable stair assembly may further include a threshold plate connected between the first and second stair stringers with pairs of hinge receptacles at ends thereof. A hinge plate may be securable to a structure, and the hinge plate may include hinge channels. The hinge receptacles of the threshold plate may be positionable into alignment with the hinge channels of the hinge plate. The assembly may also include a pair of spring-loaded hinge pins including a pin member disposed through the hinge channels and the hinge receptacles and a spring member positioned between each of the pairs of hinge channels. In this context, the spring member may include a fixed end that is fixed to the pin adjacent an inside end of the pin, where the spring member may be sized larger than the hinge receptacles. The pin member may include a recess, and the spring member may be tapered at the fixed end, where the fixed end engages the recess in the pin member. The pin member may be displaceable between a lock position and a release position, and the spring member may bias the pin toward the lock position. The pin member may include a handle. In the lock position, the handle of the pin member may be covered by the threshold plate.

In another exemplary embodiment, a stowable stair assembly includes a stair framework including a plurality of step treads, and a threshold plate connected to the stair framework. The threshold plate includes pairs of hinge receptacles at ends thereof. A hinge plate securable to a structure includes hinge channels, where the hinge receptacles of the threshold plate are positionable into alignment with the hinge channels of the hinge plate. A pair of spring-loaded hinge pins include a pin member positionable through the hinge channels and the hinge receptacles and a spring member positioned between the pairs of hinge receptacles.

The stair framework may include first and second stair stringers, where the plurality of step treads are connected between the first and second stair stringers. The threshold plate may be connected between the first and second stair stringers.

BRIEF DESCRIPTION OF THE DRAWINGS

These and other aspects and advantages will be described in detail with reference to the accompanying drawings, in which:

FIG. 3A is a close-up view of a stabilizing tube;

FIG. 4 is a side view of the stair stringer;

FIG. 5 is a perspective view of the stair stringer;

DETAILED DESCRIPTION

Figure 1:
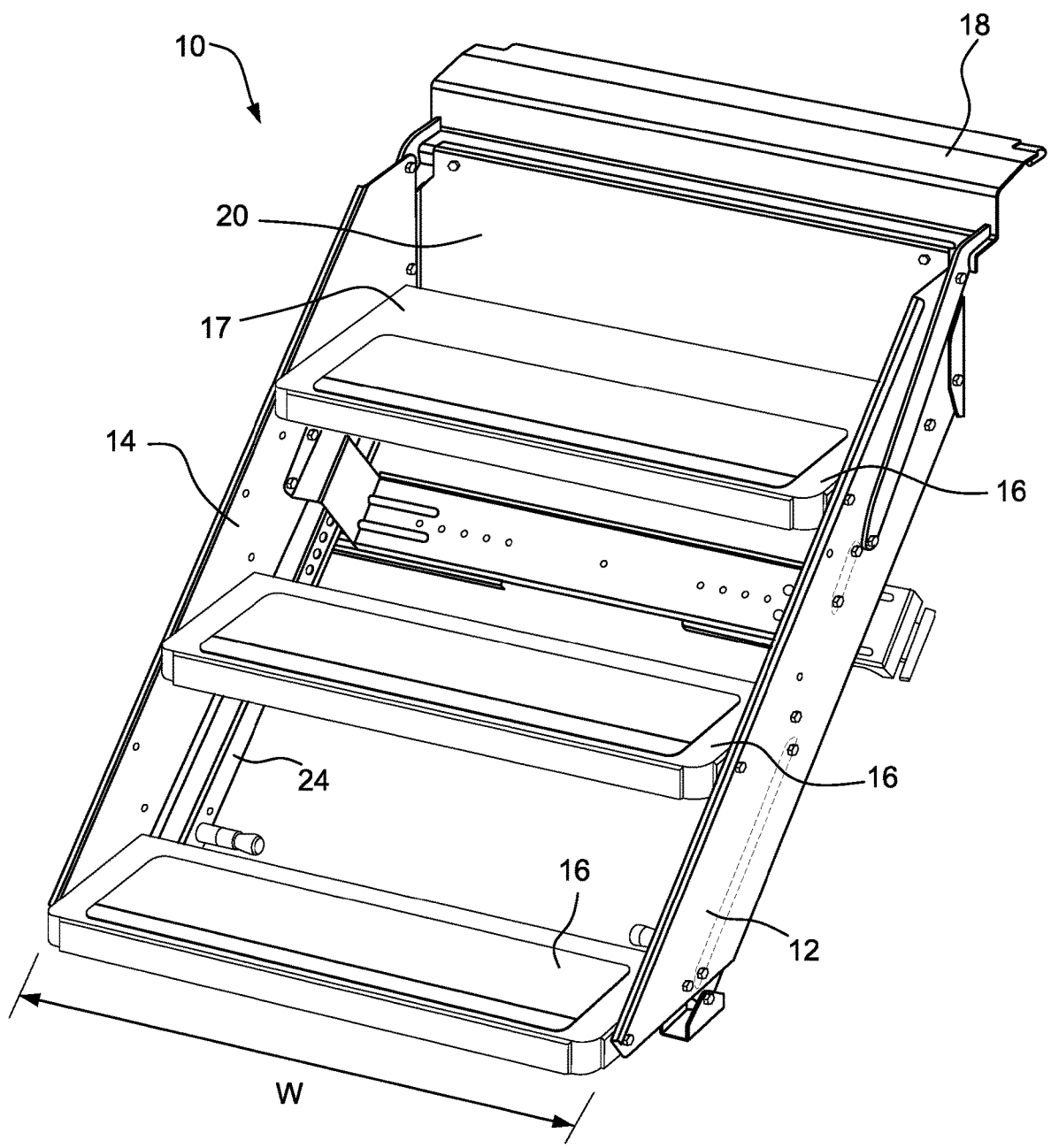
FIG. 1 is a perspective view of the stowable stair assembly according to the described embodiments.
Figure 2:
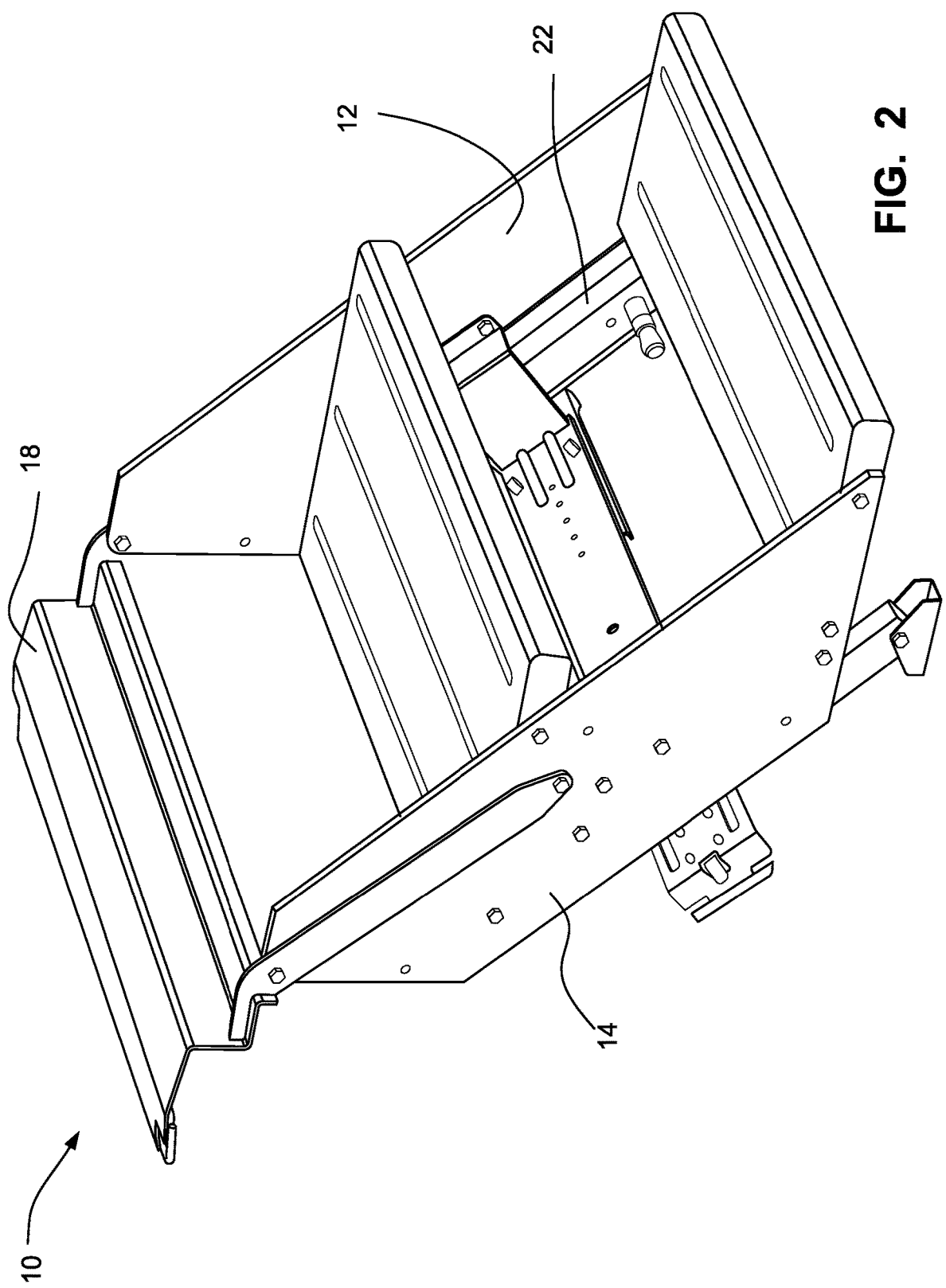
FIG. 2 is an opposite side view showing a stair assembly without a kick plate.

FIGS. 1 and 2 show a stowable stair assembly 10 including a first stair stringer 12 and a second stair stringer 14 aligned with and generally parallel to the first stair stringer 12. A plurality of step treads 16 are connected between the first and second stair stringers 12, 14 and span a width W. The step treads 16 may be secured between the first and second stair stringers 12, 14 in a suitable manner using appropriate connectors or the like. A threshold plate 18 is connected between the first and second stair stringers 12, 14 above the top step 17. The threshold plate 18 (discussed in more detail below) may be engageable with the floor of a recreational vehicle (RV) or other structure. A kick plate 20 may also be connected between the first and second stair stringers 12, 14 to protect the RV or other structure sidewall from user shoes.

A first stabilizing leg 22 is coupled with the first stair stringer 12, and a second stabilizing leg 24 is coupled with the second stair stringer 14. The stabilizing legs 22, 24 are identical in construction, and details of only one of the legs 22, 24 will be described.

Figure 3:
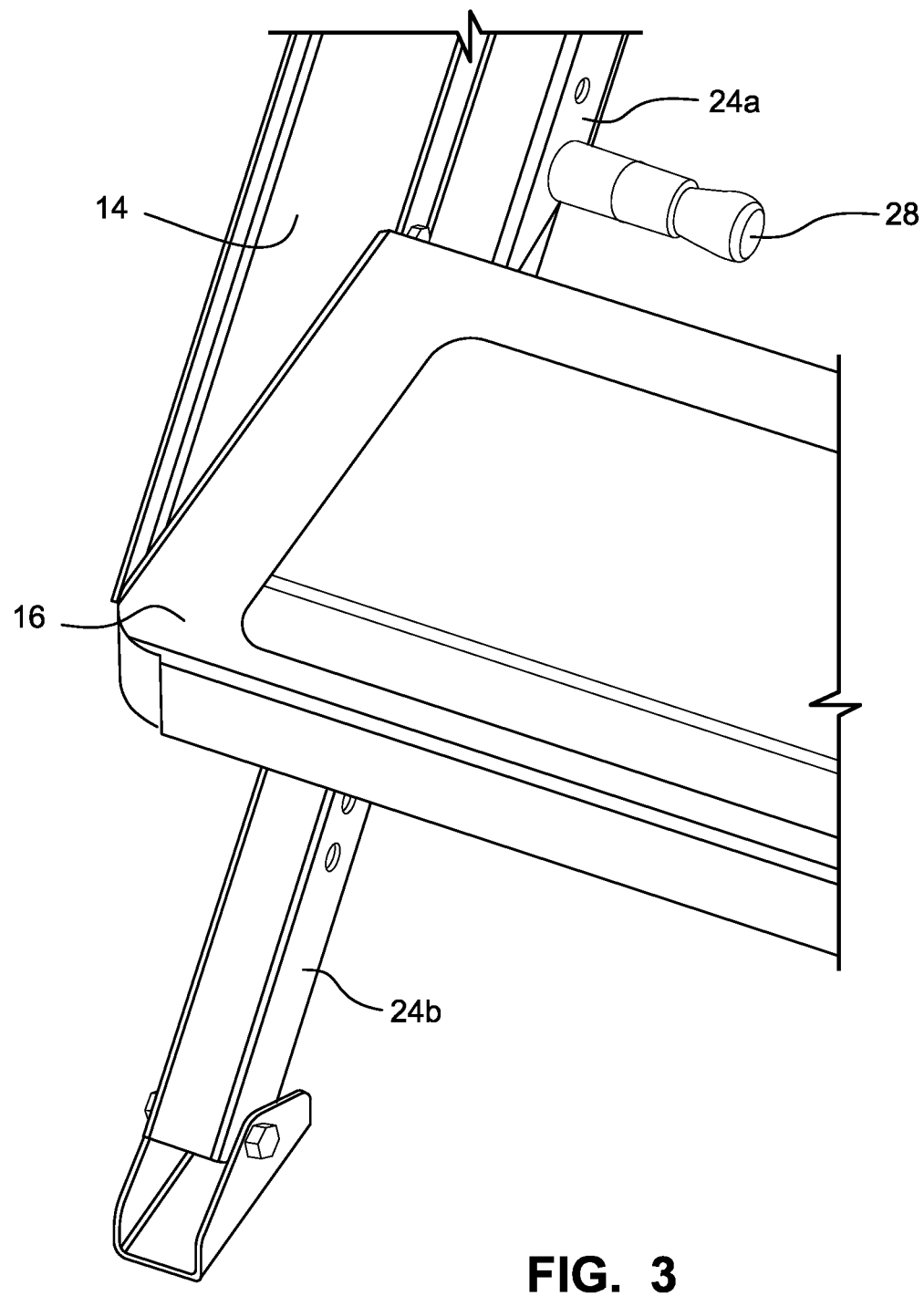
FIG. 3 is a close-up view of the bottom step and one of the telescoping stabilizing tubes.

With reference to FIG. 3, each of the stabilizing legs 22, 24 includes a channel part 22a, 24a and a telescoping part 22b, 24b. The channel parts 22a, 24a are secured on inside facing surfaces of the first and second stair stringers 12, 14, respectively. A pivotable foot 26 may be attached at distal ends of each of the telescoping parts 22b, 24b.

In use, the telescoping parts 22b, 24b are displaceable in the channel parts 22a, 24a between a retracted position (FIG. 1) and an extended position (FIGS. 3, 3A). Each of the stabilizing legs 22, 24 may be provided with a locking pin 28 positionable through the channel parts 22a, 24a into the telescoping parts 22b, 24b, respectively, to lock the telescoping parts 22b, 24b relative to the channel parts 22a, 24a. The locking pin 28 could be spring-loaded or tethered in connection with the stabilizing legs 22, 24 or could be a removable pin.

In some embodiments, the first and second stair stringers 12, 14 are formed from a single sheet with at least one bent section 30 (see FIGS. 4 and 5). In this context, the channel parts 22a, 24b of the first and second stabilizing legs 22, 24 may be secured on the bent sections 30 of the stair stringers 12, 14. The single sheet construction of the stair stringers 12, 14 serves to reduce the weight of the stair assembly 10 and to simplify manufacture. Additionally, with reference to FIGS. 1-3, the stabilizing legs 22, 24 secured on the inside facing surfaces of the stair stringers 12, 14 are thus positioned within a width W of the step treads 16 and behind the step treads 16. This configuration enables a width W of the step treads 16 to be maximized. Moreover, the steps 16 can be readily removed for service or replacement or the like without requiring the entire stair assembly 10 to be disassembled or removed from the RV or structure.

The stair stringers 12, 14 and the positioning of the stabilizing legs 22, 24 thus simplify the step assembly components and reduce material. Still further, because the stabilizing legs 22, 24 are positioned within the width W and behind the step treads 16, a reduced trip hazard is achieved with the stabilizing legs in a fully extended position. That is, because the stabilizing legs 22, 24 are positioned behind the step treads 16, in full extension, a distance that the feet 26 of the stabilizing legs extend forward of the stair assembly 10 is reduced, resulting in a reduced trip hazard.

FIGS. 6-9 show details of a hinge assembly for securing the stair assembly 10 to the floor of the RV or other structure. With the hinge connection, the stowable stair assembly 10 can be pivoted on the hinge assembly to a stowed position where the entirety of the stair assembly 10 may be located within the interior space of the RV or other structure. The stowable stair assembly 10 can subsequently be pivoted to a use position via the hinge assembly to facilitate ingress and egress to the RV or other structure.

Figure 6:
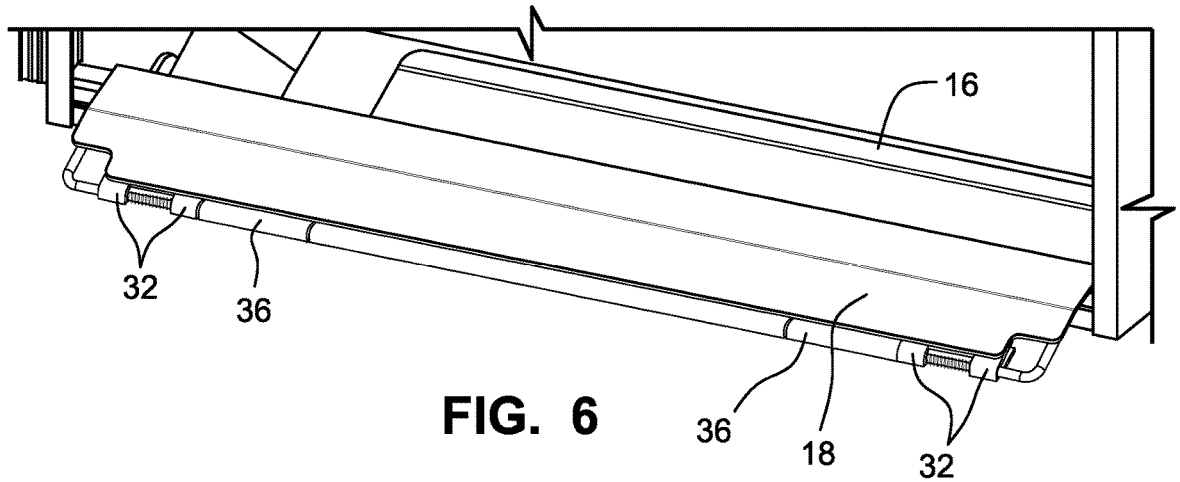
FIGS. 6-9 show the threshold plate of the stair assembly engaging a hinge plate coupled with an RV or other structure.
Figure 7:
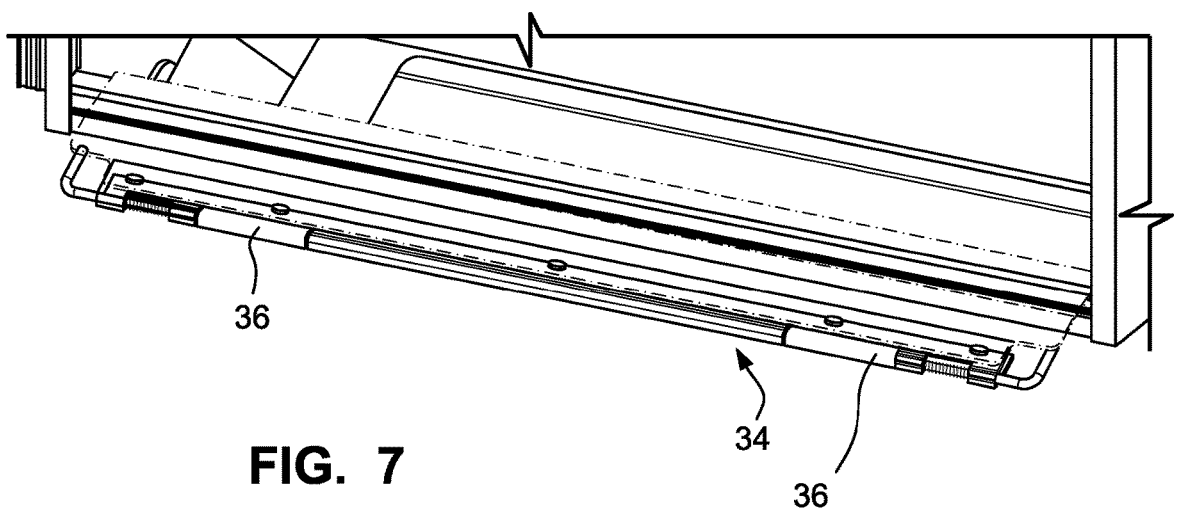
Figure 8:
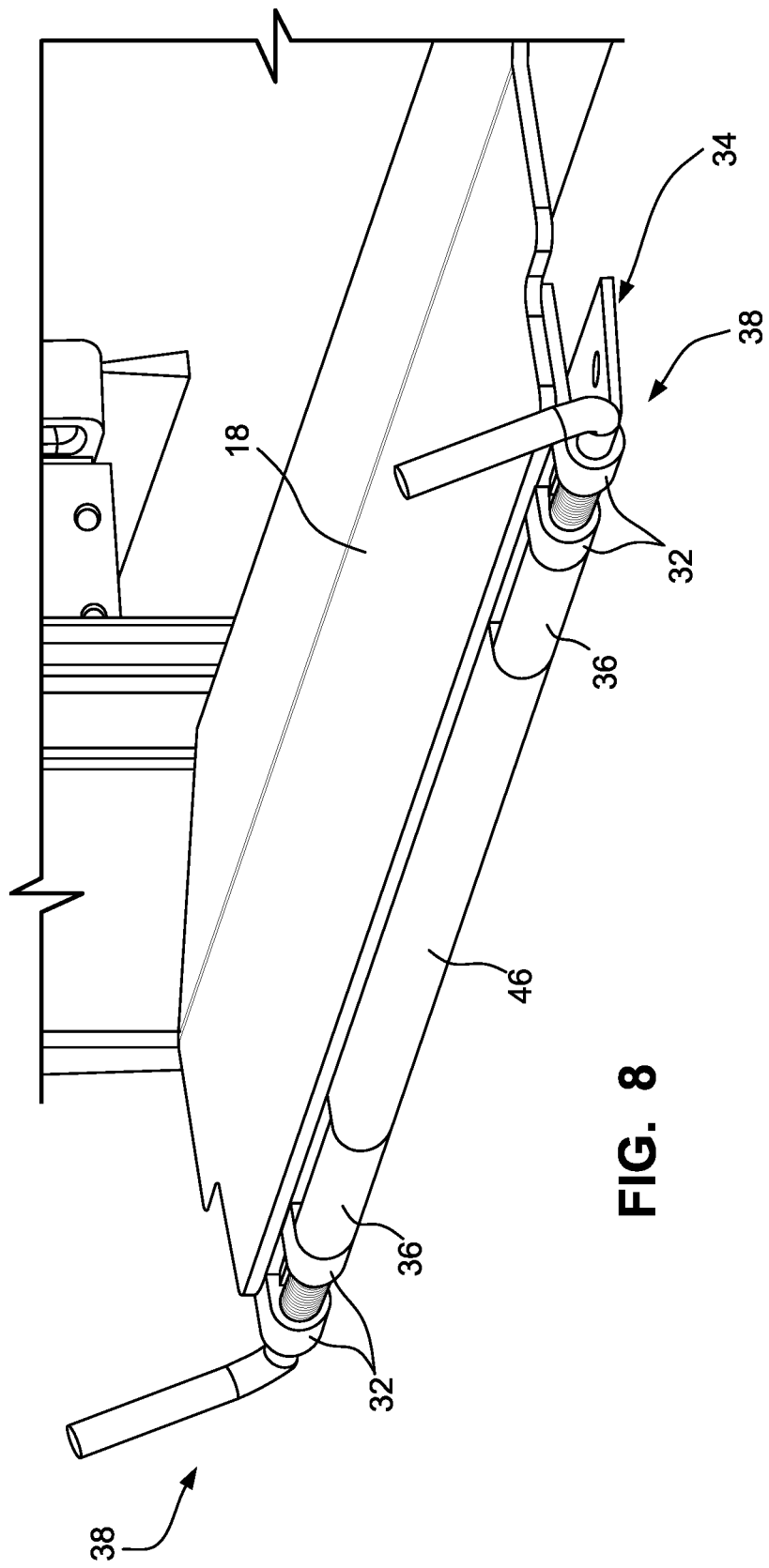
Figure 9:
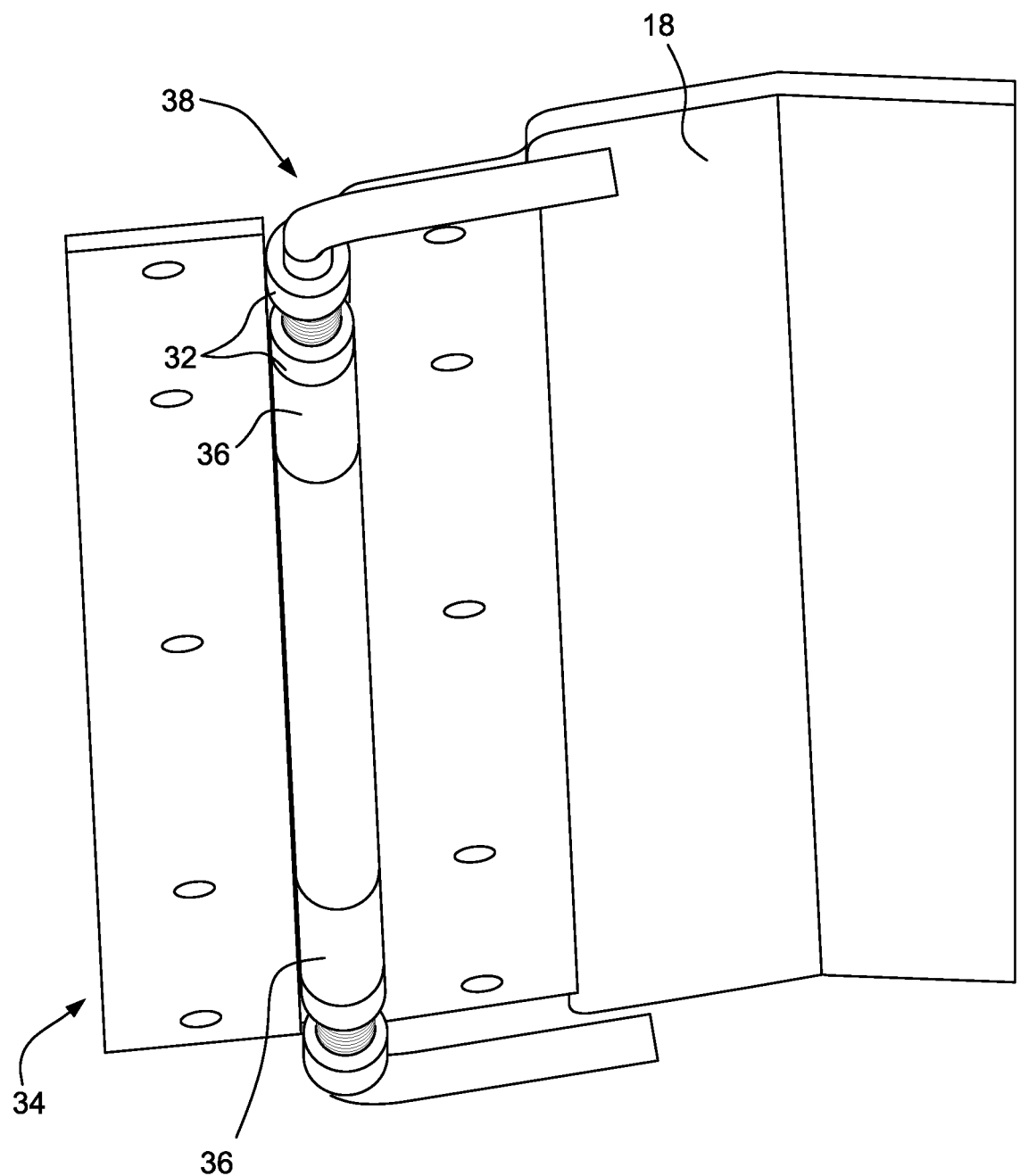

The threshold plate 18 includes hinge receptacles 32 at ends thereof. The hinge receptacles 32 are spaced as shown in FIG. 6. A hinge plate 34 may be secured to the floor of the RV or other structure. The hinge plate includes hinge channels 36. With reference to FIG. 8, the hinge receptacles 32 of the threshold plate 18 are positionable into alignment with the hinge channels 36 of the hinge plate 34.

Figure 12:
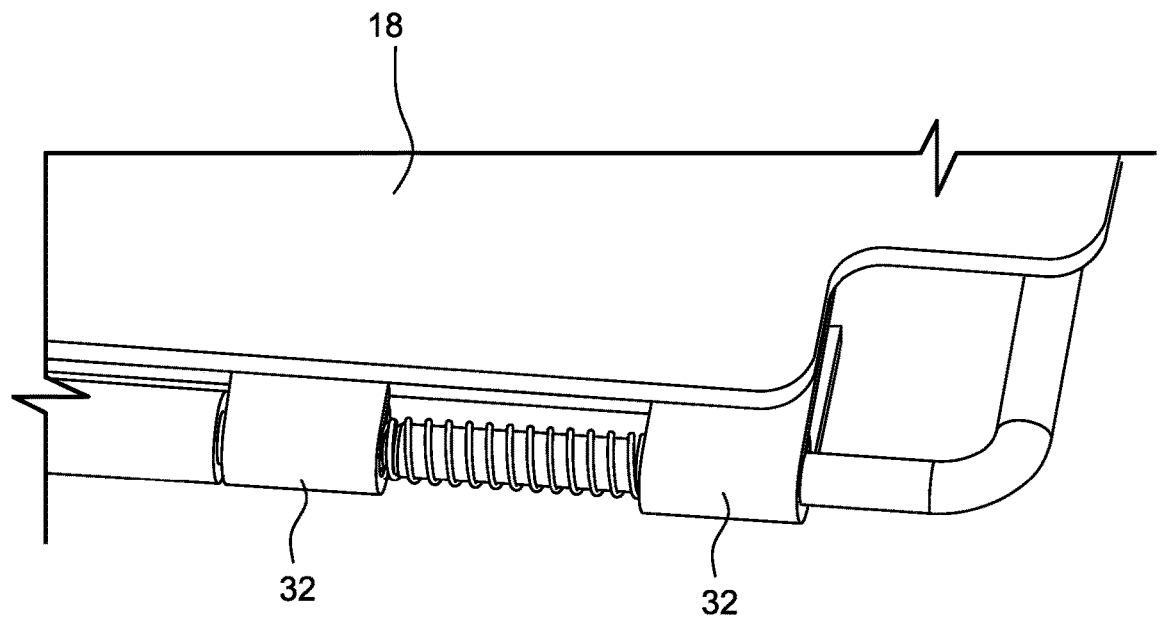
Figure 13:
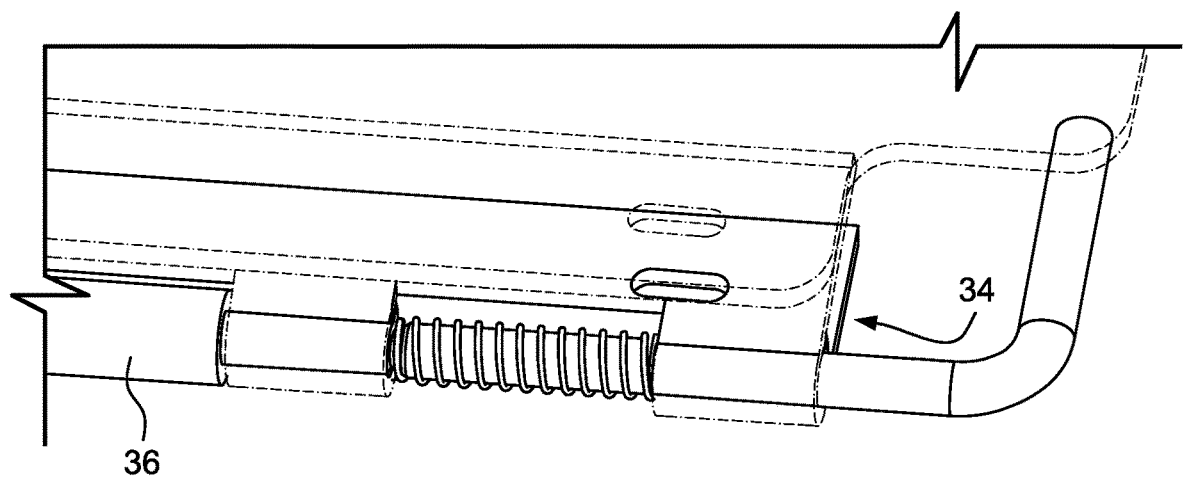
Figure 14:
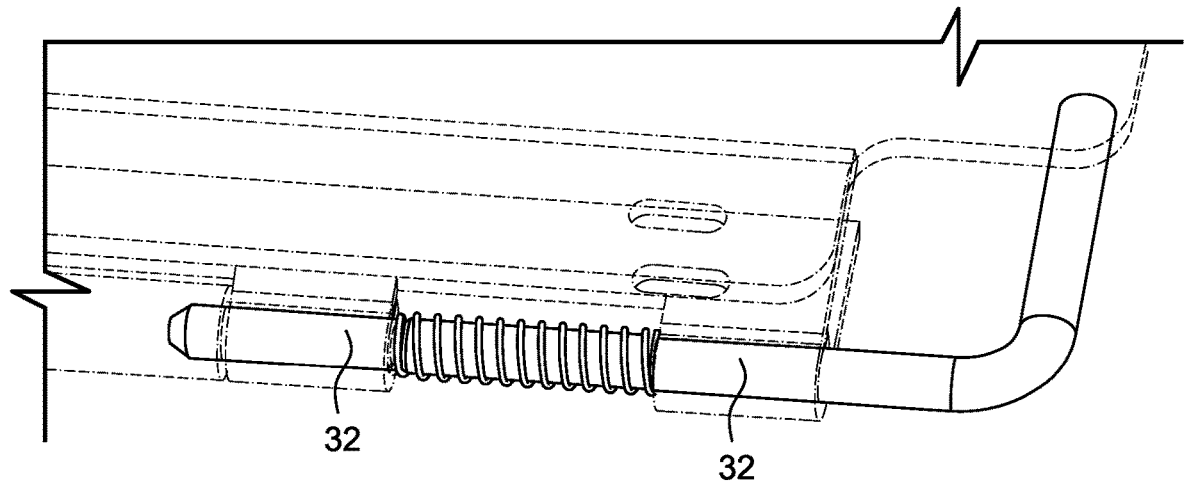
Figure 15:
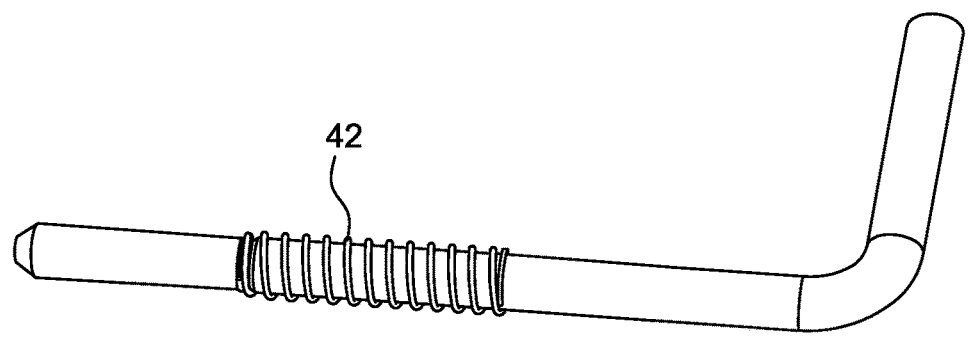
Figure 16:
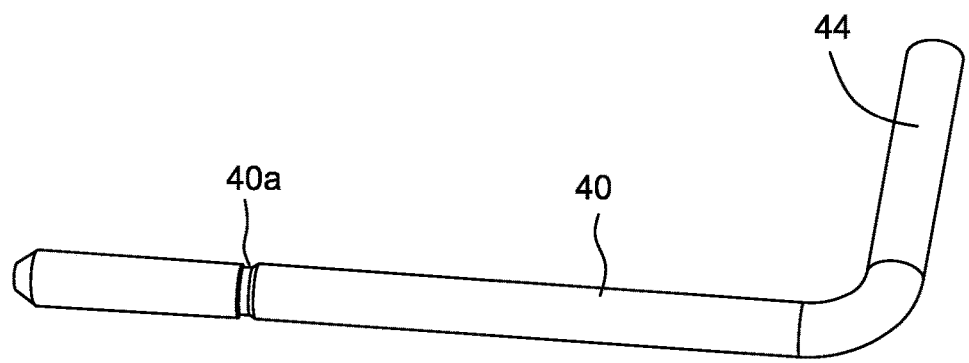
Figure 17:
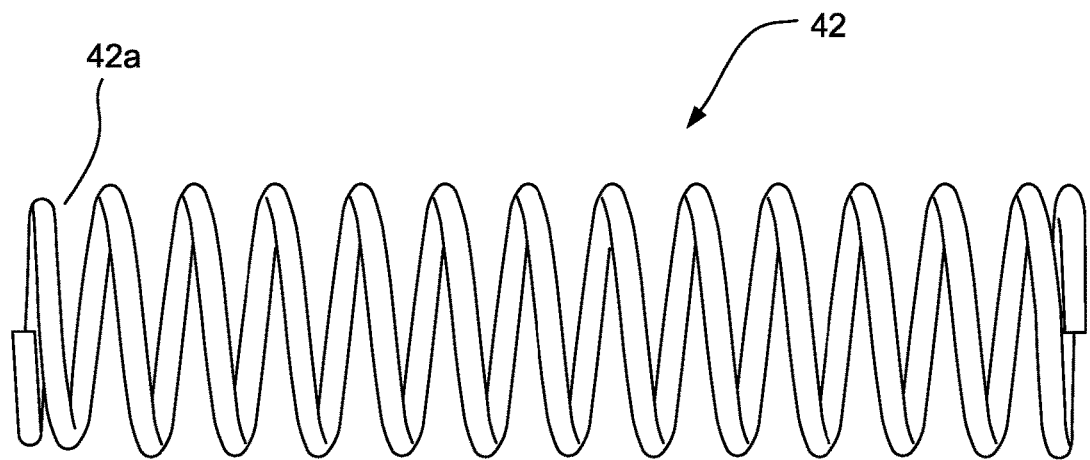
Figure 18:
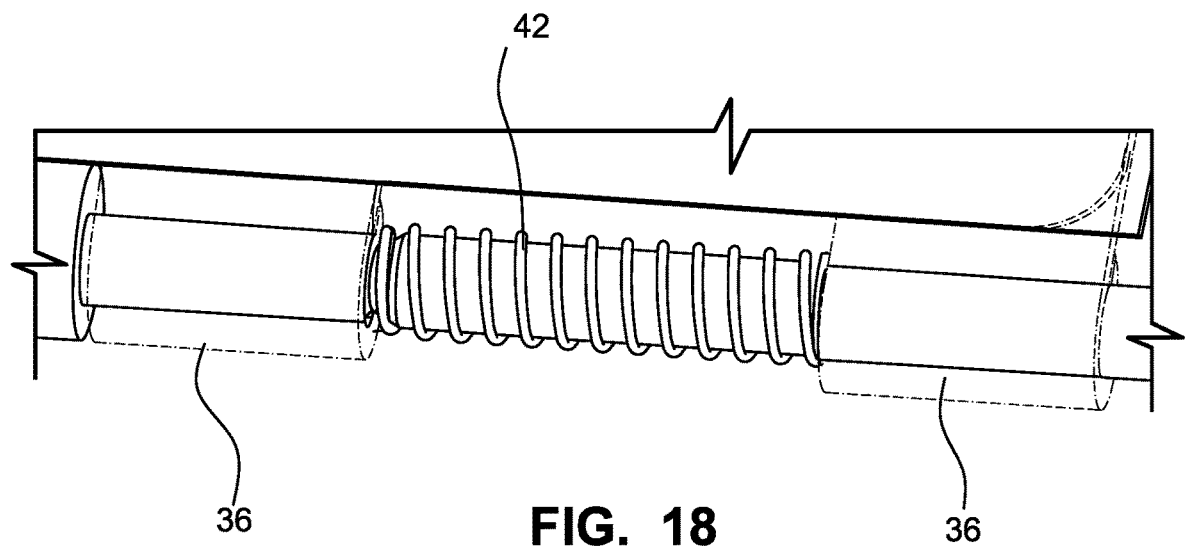

The hinge assembly is further provided with a pair of spring-loaded hinge pins 38 including a pin member 40 extendable through the hinge receptacles 32 and the hinge channels 36 to secure the stowable stair assembly 10 to the hinge plate 34, as seen in FIGS. 12-14. A spring member 42 is secured on the pin member 40 and is positioned between the hinge receptacles 32 of the threshold plate 18. Details of the pin member 40 and spring member 42 are best shown in FIGS. 15-18. The spring member 42 includes a fixed end 42a that is fixed to the pin member 40 adjacent an inside end. In some embodiments, with reference to FIG. 16, the pin member 40 is provided with a recess 40a, and the fixed end 42a of the spring member 42 is tapered to positively engage the pin member 40 via the recess 40a. The opposite end of the spring member 42 has a larger diameter than a diameter of the hinge receptacles 32. The hinge pin 38 may also be provided with a handle 44.

Figure 10:
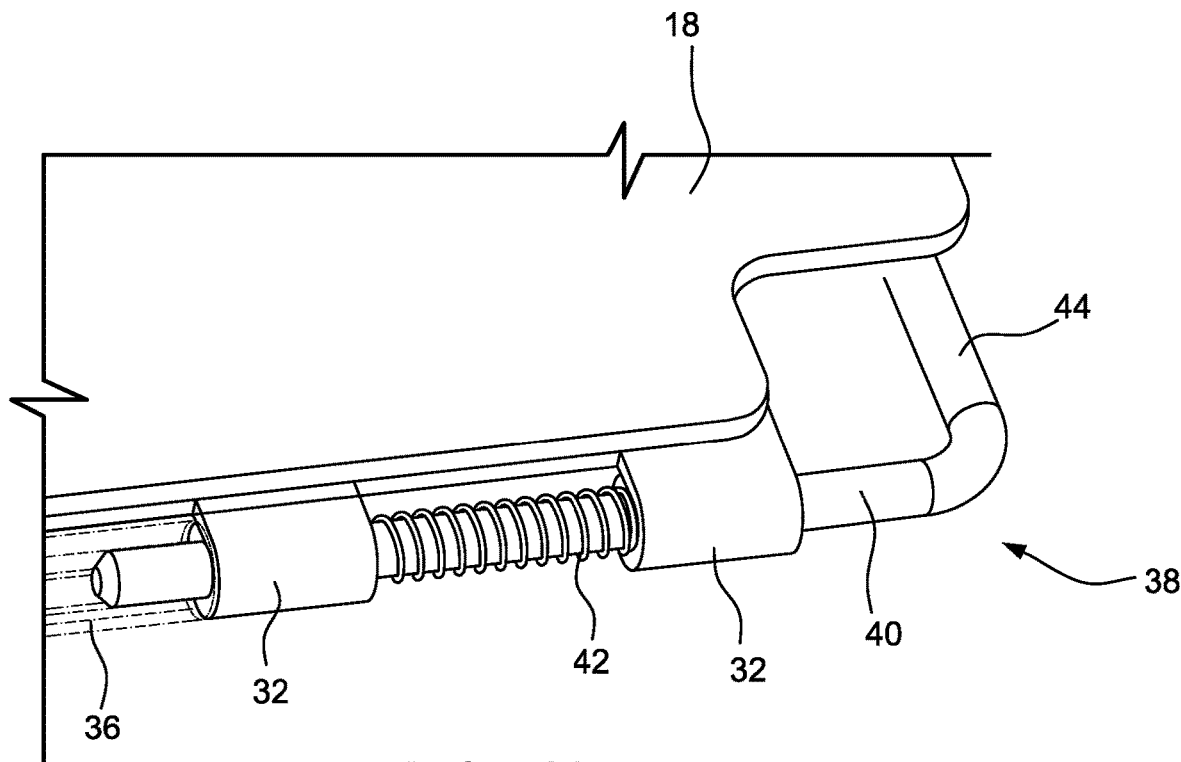
FIGS. 10-18 show details of the spring-loaded hinge pins.
Figure 11:
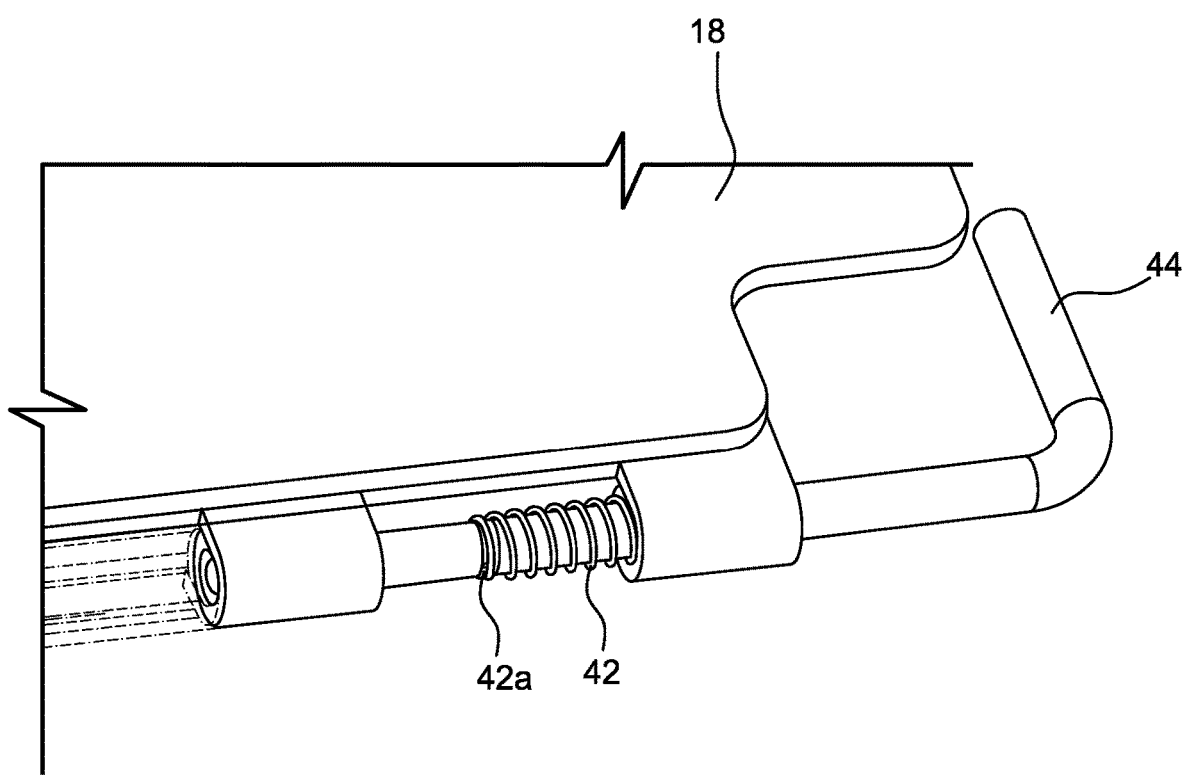

With reference to FIGS. 10 and 11, the hinge pin 38 is displaceable between a locked position (FIG. 10), in which the pin member 40 extends through the hinge receptacles 32 of the threshold plate 18 and into the hinge channels 36 of the hinge plate 34, and a release position (FIG. 11), where the hinge pin 38 is manually displaced via the handle 44 or the like against the force of the spring 42 out of engagement with the hinge channel 36 of the hinge plate 34. In the release position, the stowable stair assembly 10 can be lifted off of the hinge plate 34. In the lock position, the stowable stair assembly 10 can be pivoted between the use and stowed positions while being attached to the RV floor. When the spring member 42 positively engages the pin member 40 and is also positioned between the hinge receptacles 32 of the threshold plate 18, the hinge pin 38 may move between the locked position and the release position without being completely detached from the threshold plate 18 or stair assembly 10. This allows for the stair assembly 10 to be removed from and secured to the vehicle floor without the need for additional components or loose pins that may be easily lost or misplaced.

In some embodiments, the threshold plate 18 or the hinge plate 34 may be provided with a center section 46 to provide for a more uniform appearance when installed.

With continued reference to FIGS. 10 and 11, in the locked position shown in FIG. 10, the handle 44 of the pivot pin 38 may be covered by the threshold plate 18. An extended section of the threshold plate 18 ensures that the pin 38 will always rotate with the stair assembly 10 when displacing the stair assembly from the stowed position to the deployed position. With the pin 38 in the locked position, the threshold plate 18 thus prevents the pin handle 44 from sticking straight up, which is a potential hazard during use.

The stowable stair assembly of the described embodiments is lighter and leaner than existing designs while also enabling the use of wider step treads. The hinge pin assembly facilitates installation of the stair assembly and enables the stair assembly to be completely removed from the RV from both the stowed and deployed positions.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A stowable stair assembly comprising:
a first stair stringer;
a second stair stringer aligned with the first stair stringer;
a plurality of step treads connected between the first and second stair stringers;
a first stabilizing leg coupled with the first stair stringer; and
a second stabilizing leg coupled with the second stair stringer,
wherein each of the first and second stabilizing legs includes a channel part and a telescoping part such that each of the telescoping parts is independently displaceable in a respective one of the channel parts between a retracted position and an extended position, wherein the channel parts of the first and second stabilizing legs are secured on inside facing surfaces of the first and second stair stringers, respectively, and wherein the first and second stabilizing legs are positioned within a width of the step treads and behind the step treads.

2. A stowable stair assembly according to claim 1, wherein the first and second stair stringers are formed from a single sheet with a bent section, and wherein the channel parts of the first and second stabilizing legs are secured on the bent sections of the first and second stair stringers.

3. A stowable stair assembly according to claim 1, wherein each of the first and second stabilizing legs includes a locking pin positionable through the channel parts into the telescoping parts, respectively, to lock the telescoping parts relative to the channel parts.

4. A stowable stair assembly comprising:
a first stair stringer;
a second stair stringer aligned with the first stair stringer;
a plurality of step treads connected between the first and second stair stringers;
a first stabilizing leg coupled with the first stair stringer;
a second stabilizing leg coupled with the second stair stringer,
wherein each of the first and second stabilizing legs includes a channel part and a telescoping part, wherein the channel parts of the first and second stabilizing legs are secured on inside facing surfaces of the first and second stair stringers, respectively, and wherein the first and second stabilizing legs are positioned within a width of the step treads and behind the step treads; and
a threshold plate connected between the first and second stair stringers, the threshold plate including pairs of hinge receptacles at ends thereof.

5. A stowable stair assembly according to claim 4, further comprising a hinge plate securable to a structure, the hinge plate including hinge channels, wherein the hinge receptacles of the threshold plate are positionable into alignment with the hinge channels of the hinge plate.

6. A stowable stair assembly according to claim 5, further comprising a pair of spring-loaded hinge pins including a pin member disposed through the hinge channels and the hinge receptacles and a spring member positioned between each of the pairs of hinge channels, the spring member including a fixed end that is fixed to the pin adjacent an inside end of the pin, and the spring member being sized larger than the hinge receptacles.

7. A stowable stair assembly according to claim 6, wherein the pin member comprises a recess, and wherein the spring member is tapered at the fixed end, the fixed end engaging the recess in the pin member.

8. A stowable stair assembly according to claim 7, wherein the pin member is displaceable between a lock position and a release position, and wherein the spring member biases the pin toward the lock position.

9. A stowable stair assembly according to claim 8, wherein the pin member comprises a handle.

10. A stowable stair assembly according to claim 8, wherein in the lock position, the handle of the pin member is covered by the threshold plate.

11. A stowable stair assembly comprising:
a stair framework including a plurality of step treads;
a threshold plate connected to the stair framework, the threshold plate including pairs of hinge receptacles at ends thereof;
a hinge plate securable to a structure, the hinge plate including hinge channels, wherein the hinge receptacles of the threshold plate are positionable into alignment with the hinge channels of the hinge plate; and
a pair of spring-loaded hinge pins including a pin member positionable through the hinge channels and the hinge receptacles and a spring member positioned between the pairs of hinge receptacles, wherein the spring member biases the spring-loaded hinge pins into engagement with the hinge channels and the hinge receptacles.

12. A stowable stair assembly according to claim 11, wherein the stair framework comprises first and second stair stringers, wherein the plurality of step treads are connected between the first and second stair stringers.

13. A stowable stair assembly according to claim 12, wherein the threshold plate is connected between the first and second stair stringers.

14. A stowable stair assembly according to claim 11, wherein the spring member comprises a fixed end that is fixed to the pin member adjacent an inside end of the pin member, and wherein the spring member is sized larger than the hinge receptacles.

15. A stowable stair assembly according to claim 14, wherein the pin member comprises a recess, and wherein the spring member is tapered at the fixed end, the fixed end engaging the recess in the pin member.

16. A stowable stair assembly according to claim 15, wherein the pin member is displaceable between a lock position and a release position, and wherein the spring member biases the pin toward the lock position.

17. A stowable stair assembly according to claim 16, wherein the pin member comprises a handle.

18. A stowable stair assembly according to claim 17, wherein in the lock position, the handle of the pin member is covered by the threshold plate.

* * * * *